July 27, 1948. W. S. CRAKE 2,446,126
FILTER-HEATER
Filed Oct. 1, 1946 3 Sheets-Sheet 1

Inventor: Wilfred S. Crake
By His Attorney:

July 27, 1948. W. S. CRAKE 2,446,126
FILTER-HEATER
Filed Oct. 1, 1946 3 Sheets-Sheet 2

Inventor: Wilfred S. Crake
By His Attorney:

July 27, 1948.                W. S. CRAKE                 2,446,126
                              FILTER-HEATER
Filed Oct. 1, 1946                                    3 Sheets-Sheet 3

Inventor: Wilfred S. Crake
By His Attorney:

Patented July 27, 1948

2,446,126

UNITED STATES PATENT OFFICE 2,446,126

FILTER HEATER

Wilfred S. Crake, Houston, Tex., assignor to Shell Development Company, San Francisco, Calif., a corporation of Delaware Application October 1, 1946, Serial No. 700,430

4 Claims. (Cl. 210—150.5)

The present invention relates to fluid filters, and is particularly directed to a filter having filtering surfaces capable of being maintained at a desired temperature, whereby the accumulation of certain clogging materials on said filtering surfaces may be prevented, and/or said materials may be removed from the filter by the application of heat.

When filtering a fluid such, for example, as mineral oil, the paraffin or asphalt in the oil tends to clog the filter to a considerable extent. According to the present invention, a wire or screen filter for mineral oil or other liquids has been found to be practical when means are provided to heat the screen in order to prevent it from being clogged by the paraffin or other deposits from the liquid being filtered.

While filtering materials having relatively high melting points, it is highly essential to maintain the temperature of said materials above a certain level to keep them in a fluid condition. At the same time, it is necessary to keep the filtering surface at or above the same temperature to prevent it from clogging or freezing when flow of fluid is interrupted, as in the manufacture of commercial grades of trinitrotoluene. Since this material freezes at about 80° C., it is necessary to heat the process equipment including valves, pipe lines, filters and vessels which handle said material in a molten condition. Clogging of the filters in such a case is a serious thing as it shuts down an entire production line.

It is therefore an object of this invention to provide a filtering apparatus wherein the filtering element may be heated.

It is a further object to provide a filter of simple and compact design having a structure that is economical in material and fabrication.

A still further object of this invention is to provide a filtering apparatus capable of self-cleaning action of the filtering surface through the application of heat to said surface.

Another object of this device is to provide a filtering apparatus having means for the accumulation and easy removal of materials removed from filtered fluid or from the filtering surface.

In accomplishing these and other objects of the invention, an improved structure has been provided, the preferred forms of which are illustrated in the accompanying drawings, wherein.

Briefly, the filter-heater comprises a central tubular mandrel, longitudinal ribs mounted radially to the long axis of the mandrel and formed or fabricated integrally with the mandrel, wrappings of wire supported on said ribs, said ribs being sufficiently high to permit free passage of liquid under the wires, an outer casing surrounding the wire wrapped mandrel, inlet and outlet liquid ports and a residue drain port in said casing, baffle elements in said casing to channel the influent liquid through the wire wrappings, and channel means from the underside of the wires to the outlet liquid ports.

Figure 1:
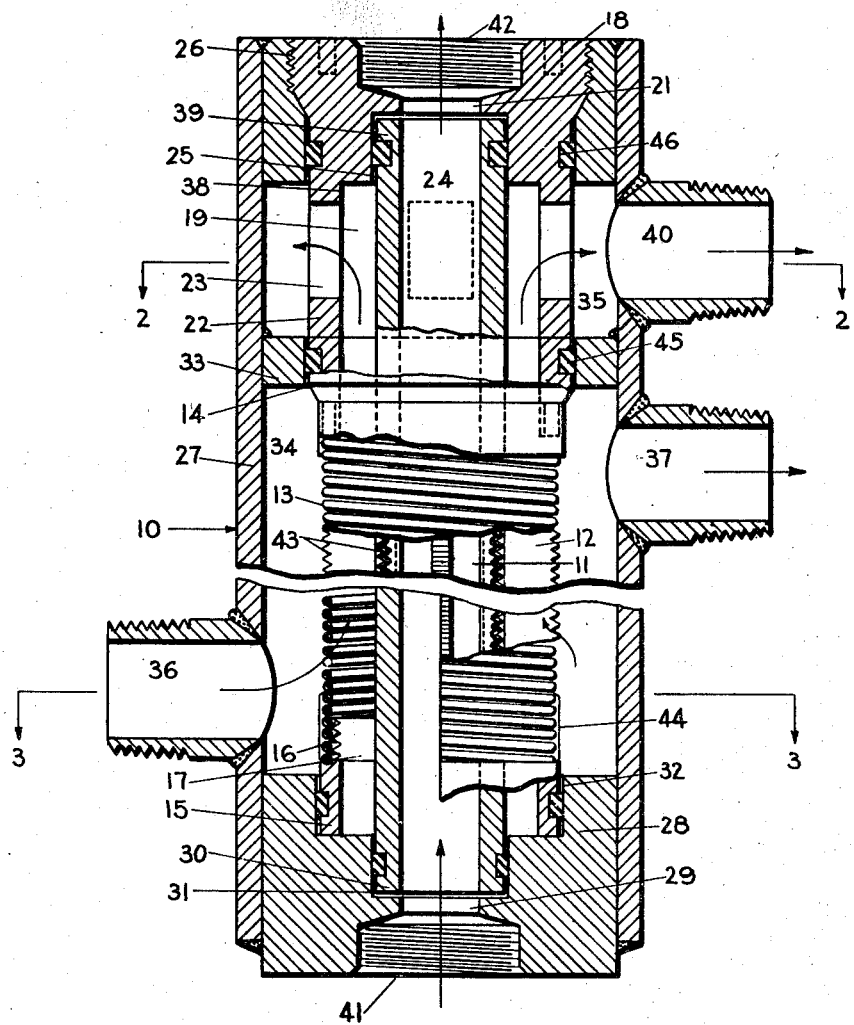
Fig. 1 is a diagrammatic view in longitudinal section of a particular embodiment of a combination filter and heater, according to the present invention.
Figure 2:
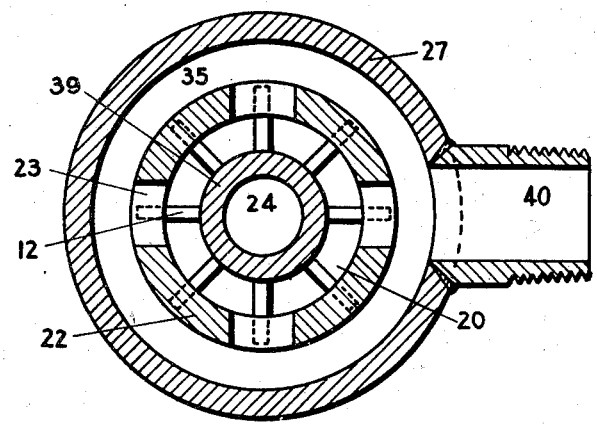
Fig. 2 is a cross-sectional view taken along the line 2—2 in Fig. 1.
Figure 3:
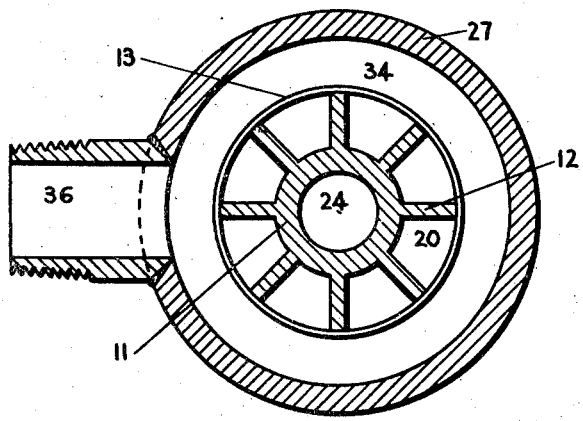
Fig. 3 is a cross-sectional view taken along the line 3—3 in Fig. 1.

Referring to Figs. 1, 2 and 3, a preferred embodiment of a filter-heater 10 of the present invention comprises a central hollow mandrel 11, the preferred form of said mandrel being tubular, radial ribs 12 carried by the mandrel 11 and wrappings of wire 13 supported on said ribs 12. End members 14 and 15 are suitably fastened to the ribs and/or mandrel 11 and provide bases for anchoring the wire 13. The end members 14 and 15 may, for example, be welded to the ribs 12, or have internal threads 16 for engagement with threads on the constricted ends 17 of the ribs 12 as shown in the lower parts of Fig. 1. The ends of the wire or wires 13 may be soldered, welded, bolted or fastened in any desired manner to the end members 14 and 15 at 44.

Adjacent the end member 14 is a removable end plug or other closure means 18 having an axial bore 21, an enlarged portion 38 of said bore being formed within an extended wall 22 of the element 18, whereby an annular passageway 19 is provided around an extended, ribless end 39 of mandrel 11, said annular passageway 19 being adapted to receive fluid flowing from grooves 20 formed between the ribs 13 on the mandrel 11, as shown in Fig. 2. The wall 22 of the element 18 contains one or more perforations or fluid openings 23.

The axial bore 21 of the end plug 18 is in register with the axial bore 24 of the extended, ribless end 39 of mandrel 11, said end of mandrel 11 being positioned and removably secured in fluid-tight contact with wall 25 of end plug 18. The end plug 18 is removably connected, as by a threaded connection 26, to an outer casing or housing 27 surrounding and containing the wire wrapped mandrel 11 and the end plug element 18. The other end of the casing 27 is closed by an end plug or other closure means 28 removably secured to or integrally united with said casing. The end plug 28 has an axial bore 29 in register with the axial bore 24 of the wire wrapped mandrel 11, said mandrel having an end 30 positioned and removably secured in fluid-tight contact with a wall 31 of end plug 28, while an end member 15 connected to the ribs 12 by screw-threads 16 is removably positioned in fluid-tight contact with a wall 32 of end plug 28. Fluid-tight contact between the various units is secured in any desired manner, as by threaded connections or by the use of ring seals 45 or packing in grooves cut in the various units as at 46.

Secured to the inside wall of the casing 27 so as to form an integral part of said casing, in fluid-tight contact with end member 14, and positioned longitudinally between the wire wrappings 13 and the perforations 23, is a transverse flange means, such as an annular ring 33. The annular ring 33, thus forms an annular closed chamber 34 around the wire wrapped mandrel 11 and a second annular closed chamber 35 around the fluid channeling element 18. Formed in the wall of casing 27 in communication with the chamber 34 is an inlet port 36 and a residue drain port 37, said ports being set preferably at least ninety degrees to each other to prevent contaminating material from entering the inlet port 36. The drain port 37 may be closed in any desired manner, as by a removable cap or a valve, not shown. Located in the wall of casing 27 in communication with the annular closed chamber 35 is an outlet port 40 adapted for suitable attachment to a conduit. The axial bore 21 of the fluid channeling element 18 and the axial bore 29 of end plug 28 are adapted for suitable connection to a fluid conduit, as by threaded connections shown at 41 and 42.

During the operation of the filter-heater of the present invention the liquid to be filtered enters inlet port 36 flowing into the annular closed chamber 34, between the wrappings of wire 13 and thence along the large grooves 20 between the ribs 12, into annular passageway 19, through perforations 23, into annular closed chamber 35 to be discharged through outlet port 40. At the same time a temperature controlling fluid flows within the central tubular mandrel through axial bores 29, 24 and 21 entering a threaded connection 41 and discharging at the opposite connection 42. For example, if a heated liquid or steam is passed within the tubular mandrel 11, thereby heating said mandrel to a high temperature, the heat supplied to the mandrel will flow by direct conduction to the ends of the ribs 12 and thence to the wire 13 in contact therewith. Due to the relatively high heat conductivity of the metallic elements 12 and 13 the wire wrappings on the mandrel 11 may thus be maintained at the desired temperature either to prevent contaminating materials from solidifying and adhering to said wire wrappings or to prevent any of the liquid from crystallizing out and blocking the openings between the wires 13. In operation, the filter-heater is preferably positioned with the axial bore 24 in a horizontal position so that any contaminating materials filtered from the liquid will settle along the inside casing wall where they may be easily removed by opening the drain port 37.

The ribs are formed integrally with or suitably fastened to the mandrel 11, as by welding, etc., and are preferably positioned to outline with their outer ends a cylindrical surface around which the wire 13 is wrapped. It is realized that fluid carrying grooves will be formed under the wire wrappings 13 when at least three ribs 12 are formed on the mandrel 11. A greater number of ribs 12 is used in the preferred embodiments of this invention in order to increase the total cross-sectional flow area of the grooves 20 between the ribs 12 and to effect a more efficient heat transfer from the mandrel 11, through the ribs 12 to the wire wrappings 13. Although the preferred form of the housing 27 and mandrel 11 is tubular or cylindrical, it is clear that these elongated elements may be given any desired cross-sectional shape, such as quadrangular, hexagonal, octagonal, etc., without departing from the spirit of this invention. Since the shape of the screen element 13, depending on the number of supporting ribs, may likewise be hexagonal, octagonal, etc., said shape approaching a true cylindrical surface as the number of the ribs is increased, the term "essentially cylindrical" is used in the present application to cover equivalent variations in the shape of any of these elements capable of serving the same purposes as truly cylindrical elements.

Preferably, the outer radial edges of the ribs 12 are cut with helical grooves 43 to receive the helical wrappings of wire 13. However, if desired, the outer radial edges of the ribs 12 may be smooth and the wire 13 welded or soldered thereto. The wire may be suitably welded or soldered after assembly in between each rib or over each rib so as to prevent unravelling in case of a broken wire. The purpose of this is to weld the wires together and not necessarily to weld them to the supports.

The wire 13 may be formed with a rectangular cross-section having spacing lugs formed thereon in a conventional manner. However, round wire, preferably of small diameter, yields several advantages when used with the structure of the present invention. The main advantages of such a structure are, first, the shorter length of screen necessary for the same screening capacity, and, second, a smaller amount of metal and other material needed to form the screen.

If a filter of lesser mechanical strength can be used where it is important to have a high screening capacity, the wrappings of wire may be replaced by a wire screen or gauze of any desired mesh. Such a wire gauze may be formed around the ribbed mandrel and attached to said mandrel and ribs in any desired manner, preferably by soldering.

Various modifications and changes may be made in the construction and arrangement of parts in the apparatus of the present invention without departing from the spirit of the present invention as defined by the scope of the appended claims.

Figure 4:
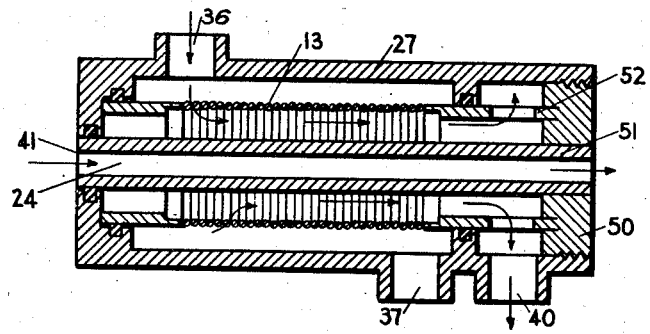
Figs. 4, 5, 6 and 7 are diagrammatic views in cross-section showing slightly modified embodiments of the present invention.

Certain elements of the present invention may be combined as shown in Fig. 4 wherein the filter-heater comprises two main parts. The first part consists of a casing 27 having an inlet port 36, an outlet port 40, a residue discharge port 37, one end of the casing having an opening 41 leading to the axial bore 24, while the other end of said casing 27 is adapted to receive and be closed by the second main port of the filter which consists of an end plate 50 to which is permanently secured the ribbed mandrel 51 having wire wrappings 13 and a tubular perforated member 52 extending to the wire wrappings and adapted to channel the filtered fluid out the discharge port 37.

Figure 5:
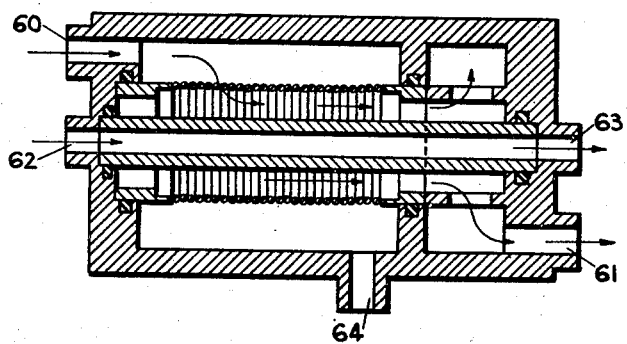
Figures 6, 7:
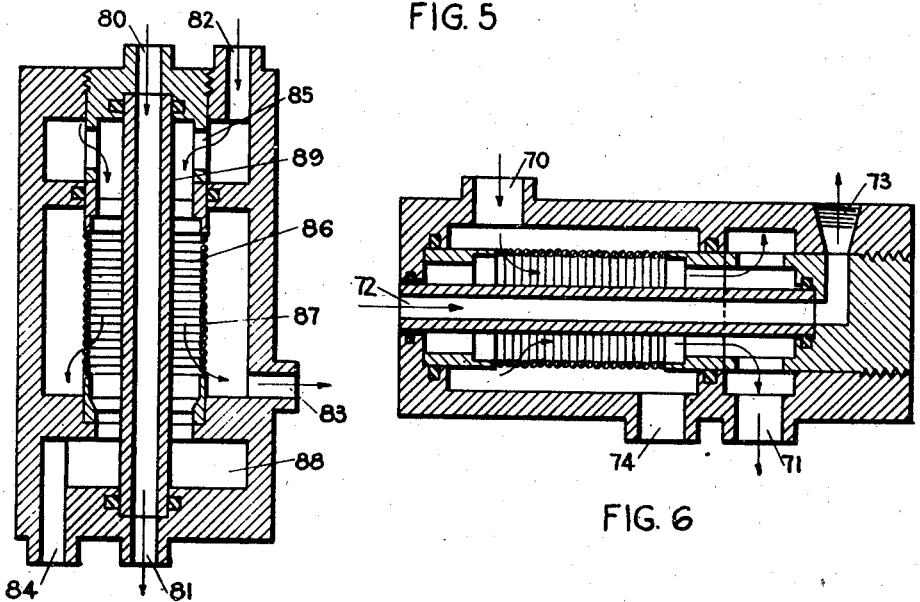

When necessary, the same type of filter may be used having inlet and outlet fluid ports 60 and 61 respectively located at the ends of the filter beside the inlet and outlet ports 62 and 63, to the ribbed mandrel as shown in Fig. 5. Or, the heating conduit may terminate on one side of the filter as shown at 73 in Fig. 6, where the other end of the conduit is at 72 and the inlet and outlet ports for the fluid to be filtered are 70 and 71 respectively. Another embodiment of the present invention is shown in Fig. 7 wherein the flow of the filtered fluid through the apparatus is reversed from that of the flow shown in the other figures, the fluid entering inlet port 82, flowing through perforations 85, along the grooves between ribs 86 on mandrel 89, and out between the wires 87 to be discharged at the outlet port 83. Any materials thus removed from the liquid remain at all times in contact with the heated surfaces of the mandrel 89, ribs 86 or wire 87 until they fall by gravity into a sludge sump 88 which may be drained through discharge port 84. Heating fluid enters port 80 and is discharged at port 81.

I claim as my invention:

1. A filter device comprising a mandrel having an axial bore, a plurality of radial rib elements extending outwardly from said mandrel, a screen element supported on the outer ends of said ribs to form a screening surface surrounding said mandrel in spaced co-axial relationship therewith, a closed housing surrounding said screen element and spaced therefrom, a flange element affixed to the housing and extending inwardly into contact with said mandrel to divide the space between said housing and said screen element into two chambers, a port through the housing to supply the liquid to be filtered to one of said chambers, a port through the wall of the housing to withdraw said liquid from the other chamber, and port means through the walls of said housing in register with the axial bore through the mandrel, whereby the heat supplied to said mandrel by means of a temperature controlling fluid admitted to said bore through said port means is transmitted by conduction through said ribs to said screen element.

2. A filter device comprising a closed essentially cylindrical housing, an essentially cylindrical screen element within said housing in spaced co-axial relationship therewith, an essentially cylindrical mandrel within said screen element said mandrel having an axial bore, longitudinal rib elements radially extending from said mandrel to support said screen element in spaced co-axial relationship with said mandrel, a flange element within said housing dividing the annular space between said housing and said screen element into two longitudinally adjacent chambers, a port through the housing to supply the liquid to be filtered to one of said chambers, a port through the housing to withdraw said liquid from the other chamber, and port means through the walls of said housing in register with the axial bore through the mandrel, whereby the heat supplied to said mandrel by means of a temperature controlling fluid admitted to said bore through said port means is transmitted by conduction through said ribs to said screen element.

3. A filtering device comprising an elongated mandrel member having an axial bore, a plurality of ribs extending longitudinally along a major portion of the mandrel member to form ribbed and ribless portions of said member, said ribs extending radially outwards to a substantial distance thus forming a series of grooves around said mandrel member, a filter screen element circumscribing and supported by the ribs, an elongated outer housing member surrounding said mandrel member, transverse flange means between the housing member and the screen defining a first chamber around the ribbed end of said mandrel and a second chamber around the ribless end of said mandrel, first port means through the outer housing member to the first chamber, second port means through said outer housing member to the second chamber, a first closure means at one end of said housing member closing second chamber and adapted to seat the ribless end of the mandrel, said first closure means having a perforated extended wall forming a passageway around said ribless portion of the mandrel, said passageway communicating with the grooves between the ribs and being in communication with the second closed chamber through the perforations in said extended wall, a second closure means at the other end of said housing member closing said first chamber and adapted to seat the ribbed end of the mandrel member, and port means through first and second closure means in register with the aixal bore through the mandrel, whereby the heat supplied to said mandrel by means of a temperature controlling fluid admitted to said bore through said port means is transmitted by conduction through said ribs to said screen element.

4. A filtering device comprising an elongated mandrel member having an axial bore, a plurality of ribs extending longitudinally along a middle portion of the mandrel member to form a ribbed center portion and ribless end portions of said mandrel member, said ribs extending radially outwards to form a series of grooves around said mandrel member, a filter screen element circumscribing and supported by the ribs, an elongated outer housing member surrounding said mandrel member, first and second transverse flange means between said housing member and the screen element defining a first and a second chamber around the ribless ends of the mandrel member and a third chamber around the ribbed center portion of said mandrel member, a first closure means at one end of said housing member closing the first chamber and adapted to seat one end of said mandrel member, port means to said first chamber, said first closure means having a perforated wall forming a passageway around one ribless end portion of the mandrel, said passageway communicating with the grooves between the ribs and being in communication with the first closed chamber through the perforation in said extended wall, a second closure means at the other end of said housing member closing the second chamber and adapted to seat the other end of said mandrel member, said second chamber communicating with the grooves between the ribs, normally closed port means to said second chamber, port means through said housing member to said third chamber, and port means through the first and second closure means in register with the axial bore through the mandrel, whereby the heat supplied to said mandrel by means of a temperature controlling fluid admitted to said bore through said port means is transmitted by conduction through said ribs to said screen element.

WILFRED S. CRAKE.